(12) United States Patent
Wasas

(10) Patent No.: US 9,290,386 B2
(45) Date of Patent: Mar. 22, 2016

(54) HYDROGEN SULFIDE CONVERSION TO HYDROGEN

(71) Applicant: SWAPSOL CORP., Eatontown, NJ (US)

(72) Inventor: James A Wasas, Placenta, CA (US)

(73) Assignee: SWAPSOL CORPORATION, Beachwood, NJ (US)

( * ) Notice: Subject to any disclaimer, the term of this patent is extended or adjusted under 35 U.S.C. 154(b) by 29 days.

(21) Appl. No.: 14/200,809

(22) Filed: Mar. 7, 2014

(65) Prior Publication Data

US 2014/0186259 A1   Jul. 3, 2014

Related U.S. Application Data

(60) Continuation of application No. 13/274,917, filed on Oct. 17, 2011, now abandoned, which is a division of application No. 12/427,571, filed on Apr. 21, 2009, now abandoned.

(60) Provisional application No. 61/124,954, filed on Apr. 21, 2008.

(51) Int. Cl.
*C01B 3/04* (2006.01)
*C01B 17/04* (2006.01)
*B01D 53/86* (2006.01)
*C01B 5/00* (2006.01)

(52) U.S. Cl.
CPC ........ *C01B 17/0495* (2013.01); *B01D 53/8612* (2013.01); *C01B 3/04* (2013.01); *C01B 5/00* (2013.01); *C01B 17/046* (2013.01); *C01B 17/0465* (2013.01); *C01B 17/0469* (2013.01); *B01D 2255/20723* (2013.01); *B01D 2255/20761* (2013.01); *B01D 2256/16* (2013.01); *B01D 2257/304* (2013.01); *B01D 2257/504* (2013.01); *Y02E 60/364* (2013.01); *Y02P 20/152* (2015.11)

(58) Field of Classification Search
None
See application file for complete search history.

(56) References Cited

U.S. PATENT DOCUMENTS

| | | | |
|---|---|---|---|
| 349,981 A | 9/1886 | Claus | |
| 354,393 A | 12/1886 | Claus | |
| 2,979,384 A | 4/1961 | Weiner | |
| 3,962,409 A | 6/1976 | Kotera | |
| 4,197,277 A | 4/1980 | Sugier | |
| 5,306,475 A * | 4/1994 | Fichtel et al. | 423/210 |
| 5,397,556 A | 3/1995 | Towler | |
| 6,099,819 A | 8/2000 | Srinivas | |
| 7,163,670 B2 | 1/2007 | Agarwal | |
| 7,455,828 B2 | 11/2008 | Selinger | |

(Continued)

FOREIGN PATENT DOCUMENTS

| | | | |
|---|---|---|---|
| EP | 1411029 | * | 6/2001 |
| EP | 1411029 | | 4/2004 |

(Continued)

OTHER PUBLICATIONS

Slimane et al., "Production of Hydrogen by Superadiabatic Decomposition of Hydrogen Sulfide" Proceedings of the 2002 U.S. DOE Hydrogen Program Review NREUCP-610-32405, pp. 1-15.

*Primary Examiner* — Melvin C Mayes
*Assistant Examiner* — Sheng H Davis
(74) *Attorney, Agent, or Firm* — Richard P Silverman & Assoc., LLC

(57) ABSTRACT

A process and system for substantially eliminating contaminants from a gas and a gas produced therefrom.

13 Claims, 4 Drawing Sheets

(56) References Cited

U.S. PATENT DOCUMENTS

| | | | |
|---|---|---|---|
| 2001/0000380 A1* | 4/2001 | Buxbaum | 95/55 |
| 2002/0023538 A1 | 2/2002 | Agarwal | |
| 2003/0182860 A1* | 10/2003 | DeVries | 48/197 R |
| 2005/0191237 A1 | 9/2005 | Selinger | |
| 2006/0140852 A1* | 6/2006 | Russell et al. | 423/652 |
| 2007/0072949 A1* | 3/2007 | Ruud et al. | 518/702 |
| 2008/0173586 A1* | 7/2008 | Kanazirev et al. | 210/660 |

FOREIGN PATENT DOCUMENTS

| | | |
|---|---|---|
| FR | 2903976 | 1/2008 |
| JP | 53130291 | 11/1978 |
| KR | 1020070062620 | 6/2007 |
| RU | 2239594 | 11/2004 |
| WO | 00/56441 | 9/2000 |
| WO | 03/101588 | 12/2003 |

* cited by examiner

HYDROGEN SULFIDE CONVERSION TO HYDROGEN

CROSS-REFERENCE TO RELATED APPLICATIONS

This application is a continuation of application Ser. No. 13/274,917, filed Oct. 17, 2011, which is a divisional application of application Ser. No. 12/427,571, filed Apr. 21, 2009, which claims the benefit of priority to U.S. Provisional Patent Application Ser. No. 61/124,954 filed on Apr. 21, 2008, the contents of which are incorporated in this application by reference.

FIELD OF THE INVENTION

The invention relates to recovering hydrogen from gases, and in particular, removing and consuming hydrogen sulfide and other contaminants from natural and industrial gases.

BACKGROUND OF THE INVENTION

Many natural gases and process gases contain hydrogen sulfide, carbon dioxide and other impurities or contaminants. It is desirable to remove these impurities or contaminants from the natural gas before using the natural gas commercially. Hydrogen sulfide occurs naturally in natural gas and is referred to as "sour gas" when the hydrogen sulfide concentration is high. Hydrogen sulfide is also produced while refining petroleum and in other processes. Natural gas may contain as much as 90% hydrogen sulfide content. Hydrogen sulfide is toxic, flammable and cannot legally be released into the air.

Hydrogen may be found in nature in the elemental form, typically in trace amounts because hydrogen is reactive. Hydrogen is a desirable fuel because it is a clean burning fuel, i.e., its combustion produces only water. Unfortunately, hydrogen is often very expensive to produce and very difficult to store and transport. For example, a steel cylinder weighing about 50 pounds (23 kg) would typically contain only about 2½ ounces (71 g) by weight of hydrogen at a pressure of up to 3,000 psi (20,684 kPa). Because of the very high pressure and extreme flammability of hydrogen, these cylinders may be very dangerous.

Processes to remove hydrogen sulfide and carbon dioxide from gases are known. For example, hydrogen sulfide and carbon dioxide may be separated from gases by means of solvent extraction, adsorption, absorption or other means.

Processes to recover sulfur from hydrogen sulfide are also known. For example, in a conventional sulfur recovery process, known as the Claus Process, up to about one third of the hydrogen sulfide in a gas may be oxidized with air or oxygen into sulfur dioxide to react with the balance of the hydrogen sulfide and produce elemental sulfur and water. Part of this process is accomplished at temperatures above 850.degree. C. and part is accomplished in the presence of catalysts, such as activated alumina or titanium dioxide. The chemical reactions of the Claus Process are:

$$2H_2S + 3O_2 \fwdarw 2SO_2 + 2H_2O$$

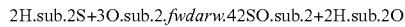

$$4H_2S + 2SO_2 \fwdarw 3S_2 + 4H_2O$$

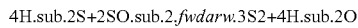

Frequently, the sulfur produced is of very low quality and often considered hazardous waste because of contamination principally caused by amine extractants commonly used entering the Claus Reactor with the hydrogen sulfide.

Another process is disclosed in U.S. Publication No. 2005/0191237. This publication discloses a process and apparatus for obtaining a hydrogen product and a sulfur product from a feed gas by separating the feed gas to obtain a purified hydrogen sulfide fraction of at least about 90% by volume hydrogen sulfide, dissociating the hydrogen sulfide in the hydrogen sulfide fraction to convert it into a purified hydrogen sulfide fraction of elemental hydrogen and sulfur, separating the dissociated purified hydrogen sulfide fraction to obtain a hydrogen rich fraction of elemental hydrogen, and obtaining the hydrogen product of elemental hydrogen. The dissociating is performed at a temperature of between 1500.degree. C. and 2000.degree. C.

U.S. Publication No. 2002/0023538 also discloses a process to remove hydrogen sulfide and other contaminants. This two-step process includes using a first adsorbent positioned in a fluidized bed operating at a temperature of about 20-60.degree. C. to remove at least a portion of the contaminants and using a second adsorbent positioned within another fluidized bed operating at a temperature of about 100-300.degree. C. to remove another portion of the contaminants from a gas. A conversion element, i.e., a nonthermal plasma corona reactor, is also disclosed for converting the contaminants to elemental sulfur and hydrogen at a temperature less than 400.degree. C.

SUMMARY OF THE INVENTION

One aspect of the invention provides a process for substantially eliminating contaminants from a gas, including providing the gas having hydrogen sulfide and hydrocarbon in a reactor, passing the gas through a heated area having a temperature of about 50.degree. C.-700.degree. C., converting the hydrogen sulfide to sulfur and hydrogen, and separating the sulfur from the gas. This process may be represented by the following chemical reaction:

$$xCH_4(g) + 8H_2S(g) \fwdarw xCH_4(g) + 8H_2(g) + S_8(s);$$

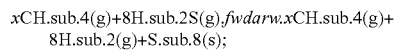

where x is any number, indicating that the ratio of hydrocarbon gas to hydrogen sulfide is variable and unimportant because it remains unaltered. The heated area is produced by a heating element comprising a catalyst and/or a resistance wire.

Another aspect of the invention provides a process for substantially eliminating contaminants from a gas, including providing the gas having hydrogen sulfide, hydrocarbon and carbon dioxide, passing the gas through a heated area having a temperature of about 50.degree. C.-700.degree. C., converting the hydrogen sulfide to sulfur and hydrogen, reacting the hydrogen with the carbon dioxide to form water and carbon and/or carsuls, oxidizing the hydrogen with the oxygen of the carbon dioxide, and separating the sulfur, water and carbon and/or carsuls from the gas. This process may be represented by the following chemical reactions:

$$xCH_4(g) + 8H_2S(g) + 4CO_2(g) \fwdarw xCH_4(g) + 8H_2O(1) + S_8(s) + 4C(s);$$

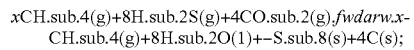

and/or $$xCH_4(g) + 8H_2S(g) + 4CO_2(g) \fwdarw xCH_4(g) + 8H_2O(1) + carsuls;$$

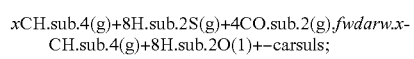

where x is any number, indicating that the ratio of hydrocarbon gas to hydrogen sulfide is variable and unimportant because it remains unaltered. The heated area is produced by a heating element comprising a catalyst and/or a resistance wire.

Another aspect of the invention provides a process for recovering hydrogen from hydrogen sulfide, including passing hydrogen sulfide through a heated area requiring a first measure of energy, producing hydrogen and sulfur, oxidizing the hydrogen with air or oxygen, and releasing a second measure of energy, the second measure of energy being 10-12 times greater than the first measure of energy. This process may be represented by the following chemical reactions:

$$8H_2S(g) \rightarrow 8H_2(g) + S_8(s);$$

and $$8H_2(g) + 4O_2(g) \rightarrow 8H_2O(g) + energy.$$

The heated area is produced by a heating element comprising a catalyst and/or a resistance wire.

Another aspect of the invention provides a process for providing hydrogen as a fuel, including storing a gas, having hydrogen sulfide, as a liquefied gas in a container, providing a reactor, having a heating element comprising at least one of a catalyst and a resistance wire, that connects to the container, releasing the gas from the container to the reactor, passing the gas through a heated area having a temperature of about 50.degree. C.-700.degree. C., converting the hydrogen sulfide to sulfur and hydrogen, and separating the sulfur from the gas.

Another aspect of the invention provides a gas substantially free of contaminants, which are removed by a process, including providing a gas having hydrogen sulfide and hydrocarbon in a reactor, passing the gas through a heated area having a temperature of about 50.degree. C.-700.degree. C., converting the hydrogen sulfide to sulfur and hydrogen, and separating the sulfur from the gas. The heated area is produced by a heating element comprising a catalyst and/or a resistance wire.

A further aspect of the invention provides a system for substantially eliminating contaminants from a gas, including a reactor for receiving the gas, having hydrogen sulfide and hydrocarbon, and a heating element within the reactor that contacts the gas to produce products substantially free of the hydrogen sulfide. The heating element comprises a catalyst and/or a resistance wire.

DETAILED DESCRIPTION OF THE INVENTION

Figure 1:
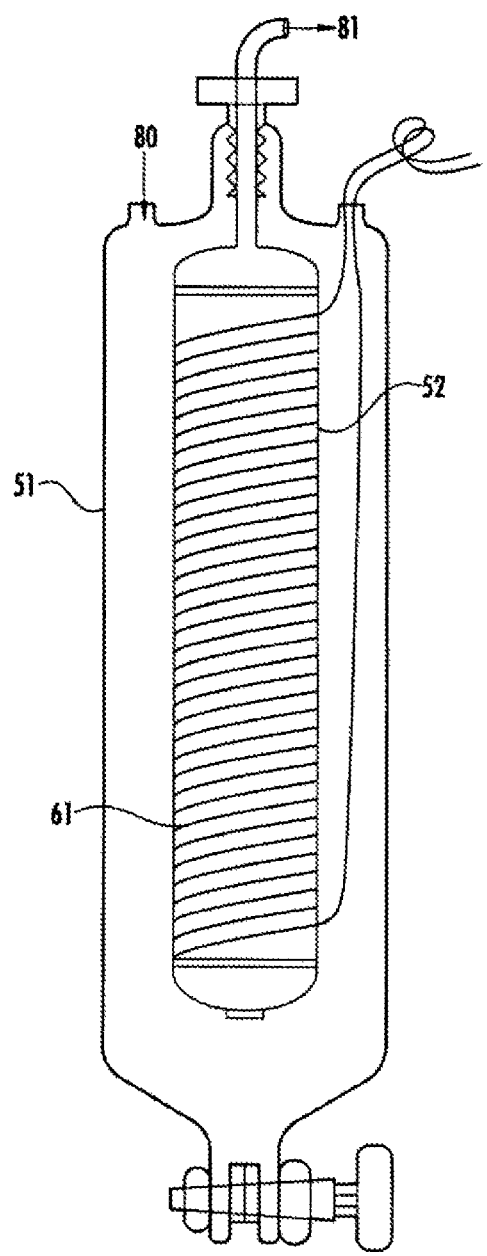
FIG. 1 is a perspective view of an exemplary reactor used in the invention.

The invention provides a process for substantially eliminating contaminants from a gas. These contaminants include hydrogen sulfide, carbon dioxide, and other undesirable contaminants, and the gas may be a natural gas, which is also referred to as "sour gas" when the hydrogen sulfide content is high, an industrial gas produced from refining petroleum or other industrial processes, or a combination thereof. Methane is a principal component in natural gas and may be a component of other gases with hydrogen sulfide. Although methane is indicated as a reactant in the process, any other hydrocarbons, such as unsubstituted and substituted hydrocarbons, including branched or unbranched alkanes and alkenes having carbon numbers from $C_1$ to $C_{20}$, preferably from $C_1$ to $C_6$, cycloalkanes, cycloalkenes, aromatic hydrocarbons or mixtures thereof, may be included in the gas. Examples include, but are not limited to, ethane, propane, butane, pentane, ethylene, and propylene. The hydrocarbon will be dependent upon the specific gas. In addition, natural and industrial gases may contain many other different contaminants and other chemicals, such as nitrogen and helium, which are not specifically listed herein.

"Substantially" means at least 50% removal, but removal may be as much as 100%. Preferably, at least 70%, more preferably, at least 85%, and most preferably, at least 95% of the contaminants are removed during the inventive process.

The process for substantially eliminating contaminants from the gas includes providing the gas with the hydrogen sulfide and other contaminants in a reactor, passing the gas through a heated area having a temperature of about 50.degree. C.-700.degree. C., converting the hydrogen sulfide to sulfur and hydrogen, and separating the sulfur from the gas. This process may be represented by the following chemical reaction:

$$xCH_4(g) + 8H_2S(g) \rightarrow xCH_4(g) + 8H_2(g) + S_8(s);$$

where x is any number, indicating that the ratio of hydrocarbon gas to hydrogen sulfide is variable and unimportant because it remains unaltered.

The gas may be fed on a continuous basis into the reactor. Before the reactor is charged with the reactants, it may be sealed and purged with inert gas, such as argon or nitrogen. Particularly if several gases will be entering the reactor, the gas(es) may also be fed through a mixer before entering the reactor. Preferably, the reactor is a continuous tubular or column reactor and there may be several in series.

On a micro laboratory scale, a thermocouple enclosed in a glass tube with a resistance wire may be used. On a medium size laboratory scale, a column-type reaction may be performed with a multi-necked glass flask, where the necks are fitted with a variable temperature heated reaction column equipped to hold packing material in place and adapters for the addition of reactants, monitoring of temperature and exit of products. The reactor may be made of temperature-resistant borosilicate glass or quartz glass, such as supplied by Pyrex®, Kimble® Glass, United Glass Technologies or others. Temperature may be measured by a thermometer or thermocouple through glass contact, or by other means, such as non-contact laser guided infrared readings. Product liquids and solids may be cooled and collected in the flask with a Vigreux column or other means. The cooled gases may pass through the liquids/solids collector to a gas sampling device and flow rate monitor.

On a large scale, the reactor may be a packed tower type reactor or any other of the numerous types of reactors commonly used for contacting reactants. The reactor may be glass-lined and/or made of hydrogen sulfide resistant metals or other materials and may also contain hydrogen porous ceramic or other types of membrane materials if it is desirable to separate hydrogen from the gas stream. On an industrial scale, the column may incorporate hydrogen sulfide resistant metallic heating/cooling coils inside the area of the reactor because the catalyst ideally is pre-heated to the operating temperature. Once the gases are fed into the reactor and the reaction is initiated, the same coils would be used to remove excess heat generated in the exothermic reaction. In one embodiment, the reactor is a catalyst coated hydrogen permeable structural ceramic column inside a hydrogen sulfide cylinder that continuously separates liberated hydrogen. The equipment is not limited to that described in the application. Any equipment may be used as long as it performs the steps of the process.

A heated element is provided in the reactor to produce a heated area. The heated element may be any element or device that provides heat, but, preferably, is a catalyst coated steam pipe or a heated resistance wire. An example of a resistance wire is nickel-chromium resistance wire, commonly referred to as nichrome wire. Catalysts may be employed to accelerate the rate of chemical reaction in the heated area of the reactor. Preferred catalysts include copper compounds, such as carbonates, hydroxides, oxides or sulfides of copper, vanadium compounds, such as oxides or sulfides of vanadium, and tungsten compounds, such as oxides or sulfides of tungsten, and mixtures thereof, but any other catalyst that accelerates the reaction may be used. Exemplary catalysts include, but are not limited to, minerals, such as malachite and azurite, and chemicals, such as vanadium pentoxide, vanadium sulfide, nichrome wire, chromium oxides, tungsten sulfide, tungsten oxides, molybdenum sulfide and titanium dioxide. Other catalysts include those specified in U.S. Pat. No. 6,099,819. The catalysts may be in any form, including powders, pellets, and other shapes suitable for a given reactor.

The catalyst may be a coating on a carrier, such as rings or beads, or may be particles that are not so fine as to prevent the flow of the gases through a heated catalytic bed. For example, the catalyst may be comprised of vanadium shavings with an oxidized surface. The catalyst is, preferably, placed in a column of such composition as to be structurally stable and resistant to attack by the gas passing through the reactor and placed above or in contact with a collector for receiving, or draining, the sulfur and purified gas. Multiple stages and additional filtration may be employed as desired to assure the elimination of entrained particulates.

Preferably, the pressure of the reactor ranges from atmospheric pressure up to 3,000 psi (20,684 kPa). Higher pressures may also be employed, where applicable, to accelerate the reaction; sub atmospheric pressures will also work. The reactor is heated to produce a heated area of a temperature of 50.degree. C.-700.degree. C. If a catalyst is used as the heating element, sulfur visibly separates from the gas stream just past the heated area. Using a catalyst other than resistance wire, the decomposition reaction of hydrogen sulfide in the gas occurs over a range of temperatures starting at about 50.degree. C. to above the melting point of sulfur, which is about 115.degree. C. at atmospheric pressure, up to about 700.degree. C. When the sulfur is above its melting point, it may run off of the catalyst and not smother it.

If the resistance wire is used as a catalyst to contact the gas, higher temperatures are usually required. Preferably, the temperature of the heated area is 400.degree. C.-700.degree. C. Higher temperatures may also be employed.

During the process of the invention, hydrogen sulfide is converted to hydrogen and sulfur and, preferably, elemental hydrogen and elemental sulfur. Rapid separation of the sulfur from the gases is preferred so that the liberated hydrogen does not react with the sulfur.

In one embodiment of the invention, a collector is used to remove the sulfur. The collector may be a receiver, moving belt, drum or of another design. The collector may also be equipped with scrapers or other devices designed to remove solidified sulfur. Multiple stages in eliminating the hydrogen sulfide may be used. If the reactor column is comprised of a material porous to hydrogen and not porous to the gas, hydrogen sulfide, or sulfur, such as controlled porosity ceramics, and the column is located inside another column that is not porous to hydrogen and of an appropriate design, the hydrogen may be removed from the gas and used separately. If any of the hydrogen is not separated from the gas after the hydrogen sulfide decomposition reaction, the gas would be fortified with hydrogen and have a higher energy content and produce less carbon dioxide when burned than gas not subject to the process of the invention.

The hydrogen gas generated by the process of this invention can be separated from the reaction products by conventional membrane technology or other means, or used immediately to convert carbon dioxide present (naturally or purposely added) in the gas into water as the principle product. When the process of this invention is used to decompose hydrogen sulfide in gas containing carbon dioxide, the hydrogen generated during the decomposition of hydrogen sulfide reacts with carbon dioxide in the gas and produces water with sulfur and carbon and/or water with carbon sulfur compounds known as carsuls.

As such, another aspect of the invention provides a process for substantially eliminating contaminants from a gas, including providing the gas having hydrogen sulfide, hydrocarbon and carbon dioxide, passing the gas through a heated area having a temperature of about 50.degree. C.-700.degree. C., converting the hydrogen sulfide to sulfur and hydrogen, reacting the hydrogen with the carbon dioxide to form water and carbon and/or carsuls, oxidizing the hydrogen with the oxygen of the carbon dioxide, and separating the sulfur, water and carbon and/or carsuls from the gas. This process may be represented by the following chemical reactions:

$x$CH.sub.4(g)+8H.sub.2S(g)+4CO.sub.2(g),*fwdarw*.$x$-CH.sub.4(g)+8H.sub.2O(1)+–S.sub.8(s)+4C(s);

and/or $x$CH.sub.4(g)+8H.sub.2S(g)+4CO.sub.2(g),*fwdarw*.$x$-CH.sub.4(g)+8H.sub.2O(1)+–carsuls;

where x is any number, indicating that the ratio of hydrocarbon gas to hydrogen sulfide is variable and unimportant because it remains unaltered.

Carbon dioxide may already be a component of the gas or added to the gas that is high in hydrogen sulfide content; hydrogen sulfide may already be a component of the gas or added to the gas that is high in carbon dioxide content. The hydrogen produced by the decomposition of hydrogen sulfide reacts with the oxygen of the carbon dioxide to eliminate the carbon dioxide in the gas. The preferred temperature in this reaction is 59.degree. C. and above for liberated hydrogen to react with the carbon dioxide.

The process of liberating hydrogen gas and elemental sulfur from the hydrogen sulfide includes combusting with oxygen, or oxidizing, the hydrogen gas to release energy and is represented by the equations:

H.sub.2S(g),*fwdarw*.H.sub.2(g)+S(s);

and 2H.sub.2(g)+O.sub.2(g),*fwdarw*.2H.sub.2O(g)+energy;

or 8H.sub.2S(g),*fwdarw*.8H.sub.2(g)+S.sub.8(s);

and 2H.sub.2(g)+O.sub.2(g),*fwdarw*.2H.sub.2O(g)+energy.

As shown in Table 1 below, the energy released in this hydrogen oxidation process is about 12 times that required in the first reaction where hydrogen is released from its bond with sulfur.

TABLE 1

| Reactant+ | Reactant+ | Reactant+ | Product+ | Product+ | Product+ | Enthalpy (delta H) kj/mole | Gibbs Free Energy (AG) | Spontaneous T (K) |
|---|---|---|---|---|---|---|---|---|
| H2S | | | H2(g) | S(s) | | 20.2 | 33.0 | −468.7 |
| CH4 | H2S | | CH4(g) | H2(g) | | 20.2 | 33.0 | −468.7 |
| CH4 | H2S | CO2 | CH4(g) | 2H2O(l) | 2S(s) + C(s) And/or Carsuls | −137.8 | −14.0 | 331.6 |
| 2H2(g) | O2(g) | | 2H2O(g) | | | −483.7 | −457.2 | 5449.0 |

The invention also provides a process for providing hydrogen as a fuel, including storing a gas, having hydrogen sulfide, as a liquefied gas in a container, providing a reactor, having a heating element, that connects to the container, releasing the gas from the container to the reactor, passing the gas through a heated area having a temperature of about 50.degree. C.-700.degree. C., converting the hydrogen sulfide to sulfur and hydrogen, and separating the sulfur from the gas. Hydrogen sulfide is a liquid at a relatively low pressure of about 250 psi (1,724 kPa) at ambient temperature. It may be stored and transported and then converted into hydrogen gas and the byproduct sulfur, which may be recycled. In addition, combusting hydrogen produces only water vapor, as opposed to pollutants produced by other fuels.

Using hydrogen as a fuel may be particularly applicable to the utility and transportation industries because hydrogen is a clean burning fuel and may be stored as a low pressure liquefied gas in ordinary containers, such as cylinders. Hydrogen, by itself, is quite reactive and flammable. Storage and transport of hydrogen typically requires thick steel cylinders of a very high pressure up to 3,000 psi (20,684 kPa). Hydrogen sulfide, on the other hand, is not nearly as reactive or flammable and can be transported in thin (and consequently very light weight) cylinders that are at a very low pressure of less than 300 psi (2,068 kPa). A cylinder of hydrogen sulfide holds 12 times as much available hydrogen as does a cylinder of hydrogen of the same size.

In this embodiment, the reactor may be included as a part of the container or attachable to the container by a hose or other apparatus to provide the hydrogen sulfide gas. When hydrogen gas is desired, the flow of hydrogen sulfide 80 passes into a chamber 51 which is resistant and impermeable to hydrogen sulfide, sulfur and hydrogen, and contacts a catalyst coated heated area 52, which is also a hydrogen permeable membrane that is impermeable to hydrogen sulfide and sulfur. A high purity hydrogen 81 passes through the hydrogen permeable membrane and out of the reactor cylinder through a delivery tube. In this embodiment, heating of heated area 52 is by way of nichrome wire 61. A final filtration through another hydrogen permeable membrane may also occur for further removal of the hydrogen sulfide. In addition, a bed of hydrogen sulfide absorbent may also be used for trace hydrogen sulfide removal. Sulfur may be collected below the bottom of the reactor.

Figure 2:
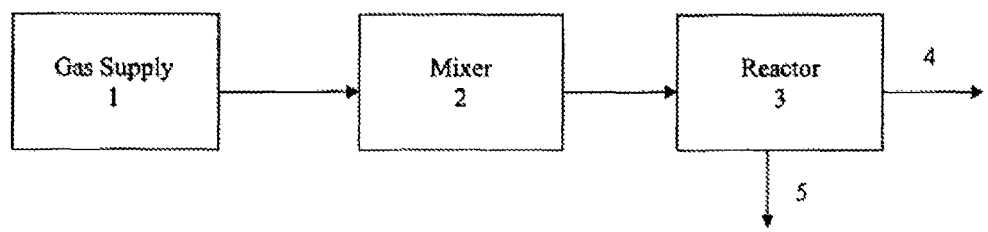
FIG. 2 is a flow diagram of the process of the invention.

The invention also provides a gas substantially free of contaminants, where the contaminants are removed by the above-described processes and a system for substantially eliminating contaminants from the gas. As shown in FIG. 2, the system includes a gas supply 1 of at least hydrogen sulfide and hydrocarbon that feeds a reactor 3. The reactor 3 has a heating element, having a catalyst and/or a resistance wire. A mixer 2, such as a static mixer, may be provided to mix the gases from the gas supply 1. The reactor 3 produces products substantially free of the hydrogen sulfide, including a substantially sulfur-free gas 4 and sulfur 5. Water may also be produced.

Although the process of the invention may be performed in any apparatus or system capable of and suitable for performing each of the steps of the process as described herein, the process is preferably performed utilizing the preferred embodiments of the system as described herein. Accordingly, the terminology as used and defined in relation to one process and system is equally applicable with respect to another process and system.

The following examples are presented to illustrate the process, system and resulting gas of the invention. These examples are intended to aid those skilled in the art in understanding the invention. The invention is, however, in no way limited thereby.

EXAMPLES

Example 1

Process for Removing Hydrogen Sulfide from Natural Gas

Figure 3:
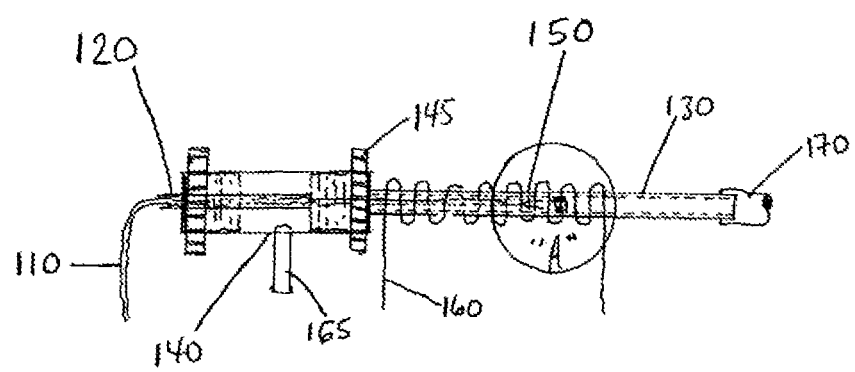
FIG. 3 is a perspective view of an exemplary reaction chamber used in the invention.
Figure 4:
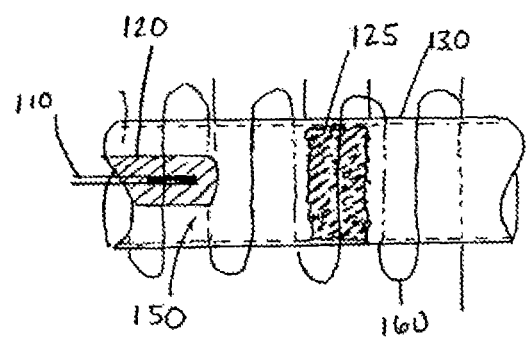
FIG. 4 is a sectional view "A" of the exemplary reaction chamber of FIG. 2.

A thermocouple 110 enclosed in a Pyrex® glass tube 120 of 3 mm outside diameter (OD) (to measure the reaction temperature) was inserted into the center of a 20 cm long by 7 mm OD Pyrex® glass tube 130 having an inner diameter (ID) of approximately 5 mm from opposite ends of a Pyrex® glass "T" 140 equipped with appropriate threaded adapters 145, thus forming a mini reaction chamber 150, as shown in FIGS. 3 and 4. Part of the outside of the 7 mm glass tube 130 was wrapped with a spiral of nichrome resistance wire 160 of 75% nickel and 25% chromium with a spacing of about 2 mm between each wire of the spiral and the temperature of this reaction chamber heating element was controlled by a laboratory rheostat.

Test gases were fed into the reaction tube 130 through the third end 165 of the "T" 140. Tests involving catalysts were conducted by placing the catalyst (not shown) in the space between the thermocouple glass tube 120 and the inside of the reaction glass tube 130. A mini reactor was created by pitching the reaction tube 130 slightly downhill at an angle of about 10 degrees from horizontal and preventing the downhill movement of the catalyst by means of a porous fiberglass plug 125, as shown in FIG. 3. Gas flow rates exiting the reaction tube 130 were monitored by attaching a piece of '1" ID Tygon® tubing (flexible tubing) 170 to the downhill end of the glass reaction tube 130 with the opposite end of the flexible tubing 170 connected to a glass bubbler or flow tube (not shown). With the test gases being a mixture of natural gas and hydrogen sulfide and using vanadium pentoxide as the catalyst in this apparatus, no hydrogen sulfide detectable to the human nose, hence in the very low ppb concentration range (4.7 ppb (parts per billion) is generally regarded as detectable to the human nose), passed out of the reactor at temperatures ranging from about 115.degree. C. to 700.degree. C. and atmospheric pressure.

Without a catalyst, no reaction was observed. In replacing the chemical catalyst with nichrome resistance wire placed inside the glass tube, rather than outside, the same reaction was observed, but at temperatures of about 400.degree. C. and above.

Example 2

Process for Removing Hydrogen Sulfide and Carbon Dioxide from Natural Gas

A thermocouple 110 enclosed in a Pyrex® glass tube 120 of 3 mm OD (to measure the reaction temperature) was inserted into the center of a 20 cm long by 7 mm OD Pyrex® glass tube 130 having an inner diameter of approximately 5 mm from opposite ends of a Pyrex® glass "T" 140 equipped with appropriate threaded adapters 145, thus forming a mini reaction chamber 150. Part of the outside of the 7 mm glass tube 130 was wrapped with a spiral of nichrome resistance wire 160 of 75% nickel and 25% chromium with a spacing of about 2 mm between each wire of the spiral and the temperature of this reaction chamber heating element was controlled by a laboratory rheostat.

Test gases were fed into the reaction tube through the third end 165 of the "T" 140. Tests involving catalysts were conducted by placing the catalyst (not shown) in the space between the thermocouple glass tube 120 and the inside of the reaction glass tube 130. A mini reactor was created by pitching the reaction tube 130 slightly downhill at an angle of about 10 degrees from horizontal and preventing the downhill movement of the catalyst by means of a porous fiberglass plug 125. Gas flow rates exiting the reaction tube 130 were monitored by attaching a piece of ¼" ID Tygon® tubing (flexible tubing) 170 to the downhill end of the glass reaction tube with the opposite end of the flexible tubing 170 connected to a glass bubbler or flow tube (not shown). With the test gases being a mixture of natural gas, hydrogen sulfide and carbon dioxide, where the hydrogen sulfide was in the ratio of two moles per every one mole of carbon dioxide, and using malachite as the catalyst in this apparatus, no hydrogen sulfide detectable to the human nose, hence in the very low ppb concentration range (4.7 ppb, parts per billion, is generally regarded as detectable to the human nose), passed out of the reactor at temperatures ranging from about 115.degree. C. to 300.degree. C. and atmospheric pressure.

Without a catalyst, no reaction was observed. In replacing the chemical catalyst with nichrome resistance wire placed inside the glass tube, rather than outside, the same reaction was observed, but at temperatures of about 400.degree. C. and above.

Example 3

Process for Recovery of Hydrogen from Hydrogen Sulfide

A thermocouple 110 enclosed in a Pyrex® glass tube 120 of 3 mm OD (to measure the reaction temperature) was inserted into the center of a 120 cm long by 7 mm OD Pyrex® glass tube 130 having an inner diameter of approximately 5 mm from opposite ends of a Pyrex® glass "T" 140 equipped with appropriate threaded adapters 145, thus forming a mini reaction chamber 150. Part of the outside of the 7 mm glass tube 130 was wrapped with a spiral of nichrome resistance wire 160 of 75% nickel and 25% chromium with a spacing of about 2 mm between each wire of the spiral and the temperature of this reaction chamber heating element was controlled by a laboratory rheostat.

Test gases were fed into the reaction tube through the third end 165 of the "T" 140. Tests involving catalysts were conducted by placing the catalyst (not shown) in the space between the thermocouple glass tube 120 and the inside of the reaction glass tube 130. A mini reactor was created by pitching the reaction tube 130 slightly downhill at an angle of about 10 degrees from horizontal and preventing the downhill movement of the catalyst by means of a porous fiberglass plug 125. Gas flow rates exiting the reaction tube 130 were monitored by attaching a piece of ¼" ID Tygon® tubing (flexible tubing) 170 to the downhill end of the glass reaction tube 130 with the opposite end of the flexible tubing 170 connected to a glass bubbler or flow tube (not shown). With hydrogen sulfide as the test gas and vanadium pentoxide as the catalyst in this apparatus, hydrogen, having no odor of hydrogen sulfide, was produced.

Without a catalyst, no reaction was observed. In replacing the chemical catalyst with nichrome resistance wire placed inside the glass tube, rather than outside, the same reaction was observed, but at temperatures of about 400.degree. C. and above.

Example 4

Process for Removing Hydrogen Sulfide from a Gas on a Larger Laboratory Scale

Figure 5:
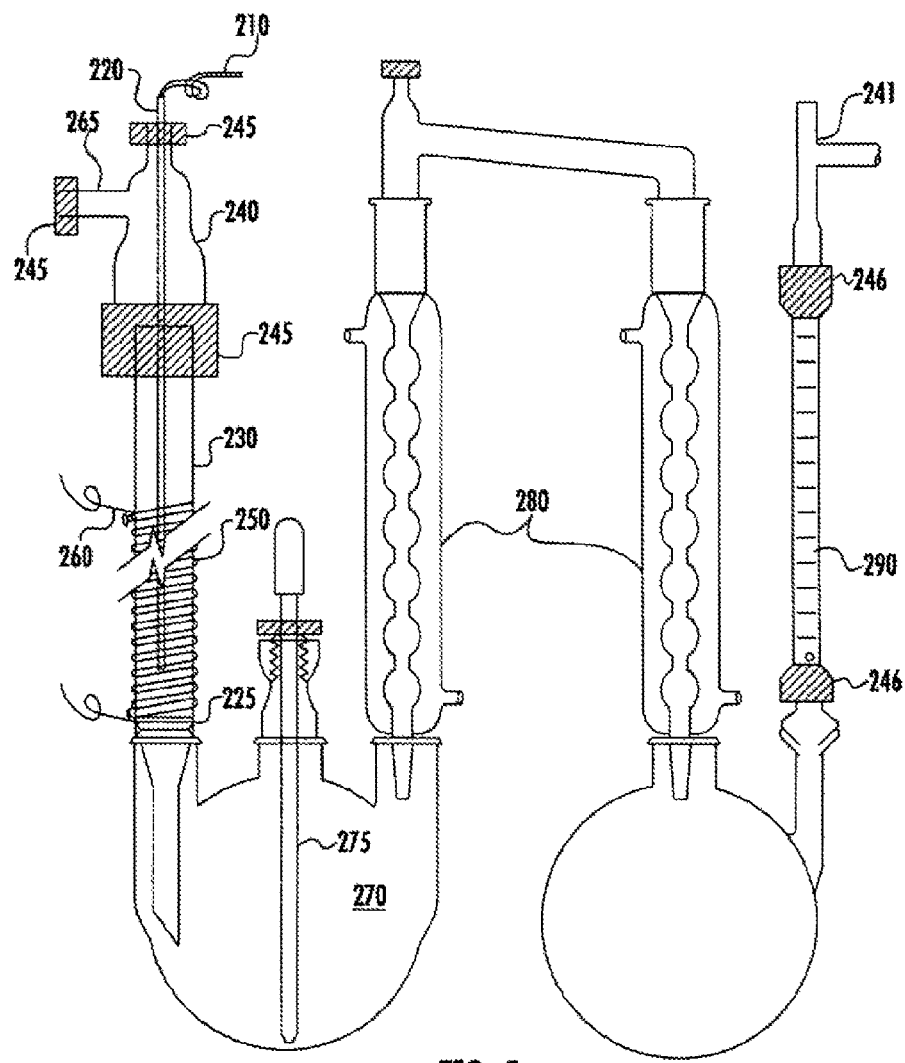
FIG. 5 is a perspective view of an exemplary reaction system of the invention.

A catalyst packed vertical column 230, as shown in FIG. 5, having a 25 mm OD borosilicate column built by United Glass Technologies, Inc. was used. Thermocouple 210 enclosed in a glass tube 220 was inserted in the column 230 and a "T" 240 equipped with appropriate threaded adapters 245, thus forming a reaction chamber 250. Part of the outside of the column 230 was wrapped with a spiral of nichrome resistance wire 260.

Test gases were fed into the column 230 through the third end 265 of the "T" 240. Downhill movement of any catalyst was prevented by means of a porous fiberglass plug 225. Gas flow exiting the column 230 were received by receiver 270, which was a Wilmad® borosilicate glass 3 necked 500 cc capacity flask. Eyedropper 275 was used to take product samples. A pair of jacketed condensers 280 were used to condense water and sulfur by means of very cold water circulating in the outer jackets. Rotameter 290, which is a flowmeter, was held in place by two adapters 246 to visually monitor the flow of gas leaving the reactor. A second "T" 241 was connected to a gas analyzer and another reactor in series.

Thus described, in the continuous flow reactor, hydrogen sulfide and carbon dioxide (in the ratio of 2 moles of H2S to 1 mole of CO2) comprising 50% of a gas blend and methane comprising another 50% of the gas blend were reacted to about 99.89% completion after brief contact with malachite as the catalyst at 154.degree. C. The liquid and solid products (water, sulfur and carbon) were collected in a 3 neck round bottom flask placed under the column and the purified methane passed out of the flask through a sub-zero condenser to a gas chromatograph in a continuous flow (samples were taken every approximately 40 minutes). This reaction was found to be thermodynamically favorable at room temperature and above, and extremely fast with a dramatic contraction of volume and temperature rise because the reaction is exothermic.

While the invention has been described in detail and with reference to specific embodiments thereof, it will be apparent to one skilled in the art that various changes and modifications can be made therein without departing from the spirit and scope thereof. Thus, it is intended that the invention covers the modifications and variations of this invention provided they come within the scope of the appended claims and their equivalents.

I claim:

1. A process for producing hydrogen from a gas stream comprising hydrogen sulfide or hydrogen sulfide and carbon dioxide, said process comprising:
   a. passing the gas stream to a vertical reactor chamber, wherein the reactor chamber has an outer cylindrical wall defining an interior chamber, said interior chamber including a heating zone, a membrane and a sulfur condenser, said reactor having:
      i. an inlet for introducing the gas stream into the interior chamber;
      ii. the heating zone disposed in the interior chamber to heat said gas stream, said heating zone comprising a catalyst consisting of malachite and a metal having 75% nickel and 25% chromium;
      iii. said membrane being a hydrogen porous ceramic membrane disposed in the interior chamber, said ceramic membrane being permeable to hydrogen gas but impermeable to hydrogen sulfide and sulfur vapor and having a membrane interior defining a flow passageway in communication with a first outlet;
      iv. the sulfur condenser being disposed in the interior chamber below the membrane in fluid communication with a second outlet; and
      v. a gas outlet in communication with the interior chamber;
   b. reacting the hydrogen sulfide and optionally the hydrogen sulfide and the carbon dioxide in the heating zone at temperature of from about 400° C. to about 700° C. wherein a conversion of hydrogen sulfide is at least about 95% to provide hydrogen gas and sulfur vapor, and optionally water in the interior chamber;
   c. continuously and immediately removing the hydrogen gas through said membrane to provide hydrogen and withdrawing the hydrogen from the first outlet;
   d. continuously condensing the sulfur vapor in the condensing zone to provide liquid sulfur withdrawing the liquid sulfur from the second outlet; and
   e. withdrawing a reactor effluent gas from the interior chamber from the gas outlet, said reactor effluent gas comprising less than about 4.7 ppb hydrogen sulfide.

2. The process of claim 1, wherein the gas stream further comprises natural gas.

3. The process of claim 1, wherein the reactor chamber includes one or more reactor chambers in series.

4. The process of claim 1, wherein the catalyst is in a form of a powder or a pellet.

5. The process of claim 1, wherein the catalyst is disposed on a carrier.

6. The process of claim 1, wherein the reactor chamber is operated at a pressure ranging from sub-atmospheric pressure up to 3,000 psi (20,684 kPa).

7. The process of claim 1, wherein the gas stream comprises up to about 90 percent hydrogen sulfide.

8. The process of claim 1, wherein the gas stream comprises a mixture of natural gas, hydrogen sulfide and carbon dioxide, having hydrogen sulfide present in a ratio of two moles of hydrogen sulfide to one mole of carbon dioxide, and wherein the catalyst comprises malachite to provide the reactor effluent gas comprising a detectable hydrogen sulfide concentration of less than 4.7 ppb.

9. The process of claim 1, wherein the conversion of hydrogen sulfide comprises at least about 99.9%.

10. The reactor of claim 9, wherein the reactor chamber comprises temperature-resistant borosilicate glass or quartz glass.

11. A reactor for the continuous conversion of hydrogen sulfide to hydrogen gas and liquid sulfur in a single vertical reactor chamber, said reactor chamber having an outer cylindrical wall defining an interior chamber, said interior chamber including a heating zone, a membrane and a sulfur condenser, said reactor chamber having:
   i. an inlet for introducing the gas stream into the interior chamber;
   ii. the heating zone disposed in the interior chamber to heat said gas stream, said heating zone comprising a catalyst consisting of malachite and a metal having 75% nickel and 25% chromium;
   iii. said membrane being a ceramic membrane disposed in the interior chamber, said ceramic membrane being permeable to hydrogen gas but impermeable to hydrogen sulfide and sulfur vapor, said ceramic membrane having a membrane interior defining a flow passageway in communication with a first outlet;
   iv. the sulfur condenser being disposed in the interior chamber below the membrane in fluid communication with a second outlet;
   v. a gas outlet in fluid communication with the interior chamber; and,
   vi) a collector in communication with the second outlet for removing said sulfur from the reactor.

12. The reactor of claim 11, wherein the collector is a receiver, moving belt, or a drum.

13. The reactor of claim 11, wherein the continuous conversion of hydrogen sulfide comprises at least about 99.9%.

* * * * *